United States Patent [19]

Owen

[11] Patent Number: 5,030,873

[45] Date of Patent: Jul. 9, 1991

[54] MONOPOLE, DIPOLE, AND QUADRUPOLE BOREHOLE SEISMIC TRANSDUCERS

[75] Inventor: Thomas E. Owen, Helotes, Tex.

[73] Assignee: Southwest Research Institute, San Antonio, Tex.

[21] Appl. No.: 395,788

[22] Filed: Aug. 18, 1989

[51] Int. Cl.⁵ ............................................. H01L 41/08
[52] U.S. Cl. ..................................... 310/337; 310/322; 310/334; 310/26; 367/155; 367/156; 367/162
[58] Field of Search .................. 310/321–323, 310/334, 337, 26; 367/155, 159, 156, 162, 172, 163, 174, 173, 168

[56] References Cited

U.S. PATENT DOCUMENTS

| | | | |
|---|---|---|---|
| 3,558,936 | 1/1971 | Horan | 310/323 |
| 4,420,826 | 12/1983 | Marshall, Jr. et al. | 310/337 X |
| 4,706,229 | 11/1987 | Congdon | 310/337 X |
| 4,706,230 | 11/1987 | Inoue et al. | 310/337 X |
| 4,731,764 | 3/1988 | Ponchaud | 310/337 X |
| 4,764,907 | 8/1988 | Dahlstrom et al. | 310/337 X |
| 4,894,811 | 1/1990 | Porzio | 310/337 X |
| 4,941,202 | 7/1990 | Upton | 310/337 X |

Primary Examiner—Mark O. Budd
Attorney, Agent, or Firm—Gunn, Lee & Miller

[57] ABSTRACT

Various configurations of cylindrically shaped transducers are used as borehole seismic wave sources. The basic class of transducers of this invention has an outer shell that is generally cylindrical, and may be comprised sections. The shell or the sections may be pre-stressed or preformed to encourage certain bending motions. Depending on the configuration of the transducer, it approximates a monopole, dipole, or quadrupole radiator. Various actuating means, including magnetostrictive forces and piezoelectric forces, are used to drive the motions of the transducer. These transducers are especially useful for generating compressional, shear, or other elastic waves in solids. For example, in geophysical applications, the transducers are placed in boreholes for either hole-to-hole or single hole measurements.

20 Claims, 5 Drawing Sheets

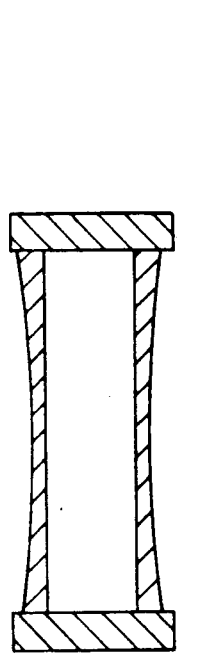 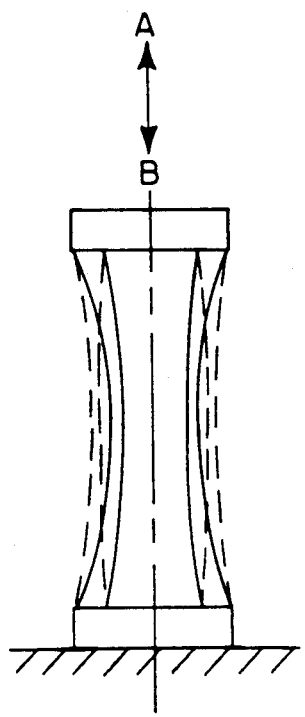 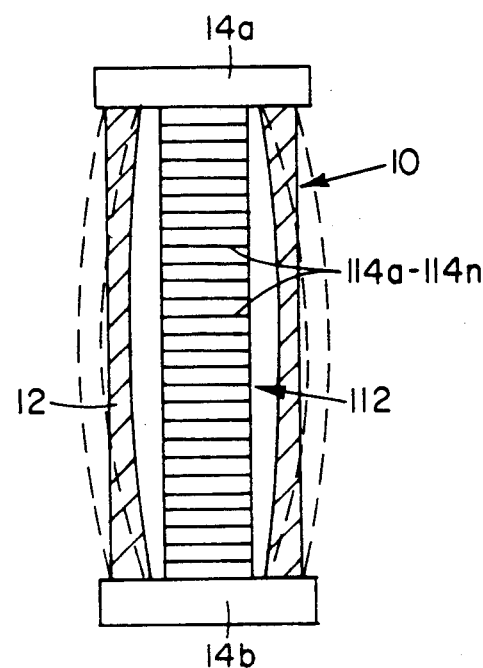
FIG. 9   FIG. 10   FIG. 11
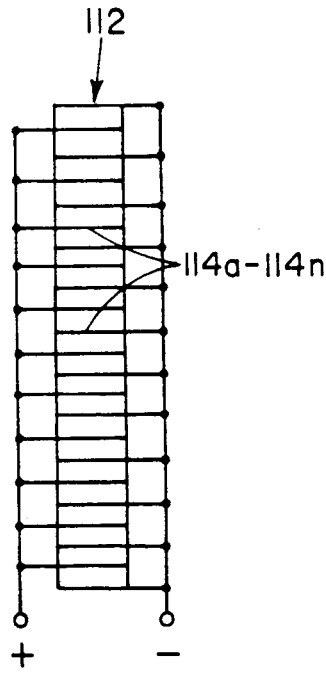 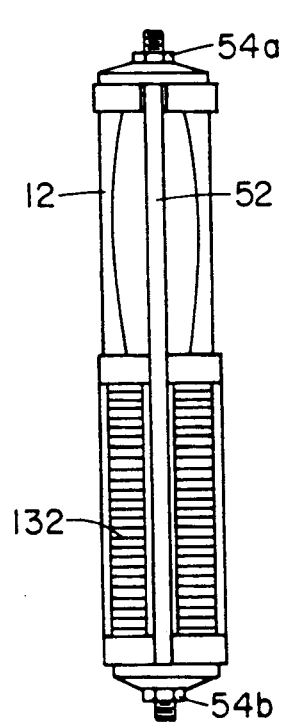 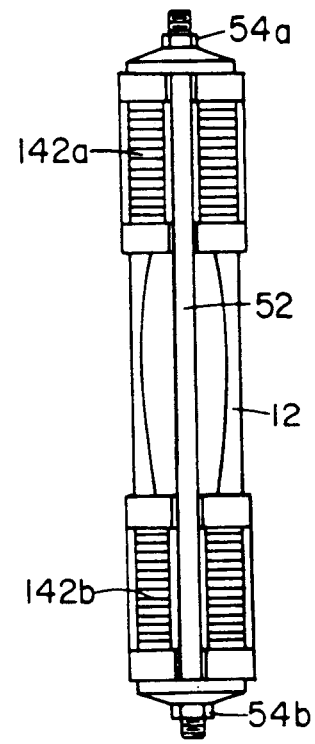
FIG. 12   FIG. 13   FIG. 14

MONOPOLE, DIPOLE, AND QUADRUPOLE BOREHOLE SEISMIC TRANSDUCERS

BACKGROUND OF THE INVENTION

1. Field of the Invention

The present invention relates generally to electroacoustic transducers, and more particularly to cylindrical transducers, actuated by piecoelectric or magnetic means, that can approximate monopole, dipole, or quadrupole acoustic radiators.

2. Description of the Related Art

Electroacoustic transducers provide a means for either generating and detecting acoustic vibrations in various sound propagation media. There are many types of acoustic transducers, with a common type being cylindrical transducers, which are characterized by a cylindrical shell that radiates or receives acoustic vibrations.

A further distinction among cylindrical transducers is the cylindrical "bender" transducer characterized by a flexural motion, or "bending", of the cylinder walls when the transducer is excited. Although cylindrical transducers, including cylindrical bender transducers, have been used to generate and receive acoustic waves in a variety of applications, their use has been characteristically limited to axi-symmetrical motions of the cylindrical structure of the transducers.

One form of cylindrical bender transducer used to generate and detect acoustic waves in geophysical applications is described in U.S. Pat. No. 4,525,646 to Shirley, et al. This transducer operates as a "self actuating" device, with the cylindrical shell being made of at least one piezoelectric layer. The active element of the transducer is the composite cylinder itself. All that is needed is the application of pressure waves or electrical energization for the transducer to operate as a detector or source. A limitation of this device is that it is directed toward a single motion of the cylinder walls, that motion being axi-symmetrical and therefore approximating a monopole source.

Geophysical exploration has long involved the use of both single borehole and hole-to-hole seismic measurements to determine characteristics of the surrounding geological environment. The seismic waves, which may be also referred to as acoustic or sonic waves, may be either compressional or shear, as well as other types of waves.

Various means have been used for generating and detecting the seismic waves. Most of the prior art involves the use of compressional waves, conveying by the earth's crust and detected on seismographs to give information about rock structures through which they travel. Of particular interest are those transducers which are capable of generating or detecting sound waves under conditions of deep borehole hydrostatic pressure and high temperatures. In the past, acoustic transducers have had difficulty meeting such rigorous environmental demands. Another requirement of such transducers, especially for hole-to-hole applications, is high power and high detection sensitivity over the frequency range of several hundred to several thousand hertz. Prior transducers have had difficulty meeting these specifications. Finally, transducers capable of preferentially generating shear waves has been a limitation in the prior art.

SUMMARY OF THE INVENTION

An object of the present invention is to provide an acoustic transducer that is easily adaptable to approximate a monopole, dipole, or quadrupole acoustic radiator. Each type of radiator is particularly suited for certain seismic wave applications. Monopole devices are primarily used to generate and detect compressional waves. Dipole devices are primarily used for shear waves. Quadrupole devices are used for higher-order wave propagation as a combination of compressional and shear waves.

Another object of the invention is to provide a source of acoustic waves for geophysical exploration. For such applications, a transducer is provided that operates with high power and high frequency.

Another object of the invention is to provide a source of seismic waves that is useful in deep boreholes. Thus a feature of one embodiment of the invention is actuation of the transducers by piezoelectric means, which permits good tolerance of high temperature. A feature of a second embodiment of the invention is actuation of the transducers with magnetostrictive means, which permits even greater temperature tolerance.

Another object of the invention is to provide a source of seismic waves that is useful for both single hole and hole-to-hole measurements. Thus, the invention provides transducers that are capable of efficient electrical-to-acoustic energy conversion as a source and high sensitivity as a detector.

BRIEF DESCRIPTION OF THE DRAWINGS

FIG. 9 is a cross sectional view of the transducer, not including actuating means, wherein the cylinder walls have been thinned to create a preference for inward bending.

FIG. 10 illustrates the motion of a transducer whose cylinder walls have been thinned as in FIG. 9.

FIG. 11 is a cross sectional view of the transducer of FIG. 1, including an actuating means comprised of a piezoelectric stack.

FIG. 12 illustrates a means for electrical connection of the piezoelectric stack of FIG. 11, such that the transducer may be energized.

FIG. 13 is a cross sectional view of the transducer of FIG. 1, including an actuating means comprised of a piezoelectric stack and a means for pre-stressing the cylinder walls against the actuating means.

FIG. 14 is an alternate embodiment of the actuating means of FIG. 13.

DESCRIPTION OF THE PREFERRED EMBODIMENTS

The transducer invention described herein has a number of different embodiments. Although all embodiments share structural similarities, such as at least one cylindrical bending member, which is or forms a generally cylindrical shaped shell, the embodiments may be technically categorized by the type of wave that is produced. Thus, three categories of transducers are described below: monopole, dipole, and quadrupole. These three categories are described below in Parts A, B, and C, respectively. All three types are useful for measurements in a single borehole, such as for sonic velocity measurements. The monopole and dipole transducers are also useful for hole-to-hole seismic imaging measurements, which are capable of characterizing large volumes of the rock formations of interest.

These three categories of transducers can be further varied according to other structural variations, such as pre-stressing means or actuating means. Generally, these variations can be used with either a monopole, dipole, or quadrupole transducer. For convenience, they are described below in connection with monopole transducers, with subsequent references to those descriptions for the purpose of describing dipole and quadrupole transducers.

A. MONOPOLE TRANSDUCERS

Figure 1:
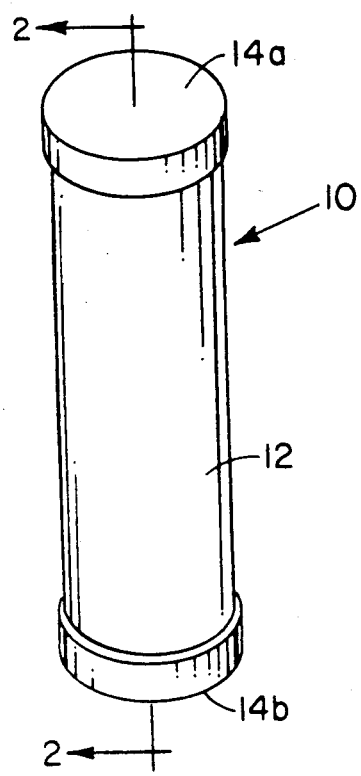
FIG. 1 is a perspective view of the invention, with no actuating means in view, which is used to approximate a monopole acoustic radiator.

FIG. 1 shows an embodiment of the invention configured as a monopole transducer 10. Although this sonic monopole transducer 10 could be used for a number of applications, it is especially well suited for use in a borehole in the earth for the purpose of measuring compressional wave velocity and other parameters of the rock formation surrounding the borehole.

The monopole transducer 10 is the simplest embodiment of one of the features of the invention, which is the driving of a cylindrical shell or cylindrical sections that approximate a cylindrical shell with an actuating means that provides an axial force on the cylinder so as to cause radially-oriented flexural deflection of the wall of the shell or walls of the sections. For monopole acoustic radiation, the radial deflection is azimuthally uniform about the axis of the cylinder and hence is axially symmetrical.

Transducer 10 has three basic parts: a hollow shell 12, end caps 14a and 14b, and an actuating means. The actuating means is shown in FIG. 1, but is shown and discussed below in connection with FIGS. 11-15.

Shell 12 is cylindrical in shape. This cylindrical shape is preferred for use in boreholes, but polygonal approximations of a cylindrical shape may also be used. Shell 12 is made of metallic, ceramic, or other material having mechano-elastic characteristics comparable to those of the actuator component of the device.

The thickness of the wall of shell 12 is small compared to the radius. The length of shell 12 is large compared to its width. The length, width, and thickness of shell 12 affect the frequency range and sensitivity of the transducer.

Figure 2A:
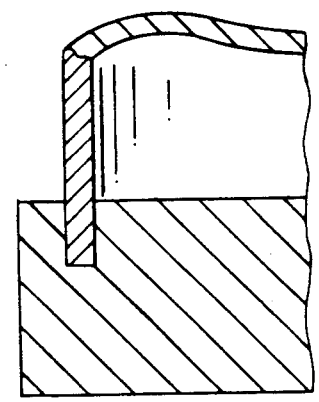
FIGS. 2A-2C show various methods of constraining the ends of the transducer of FIG. 1.
Figure 2B:
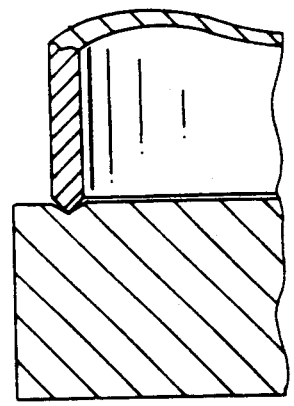
Figure 2C:
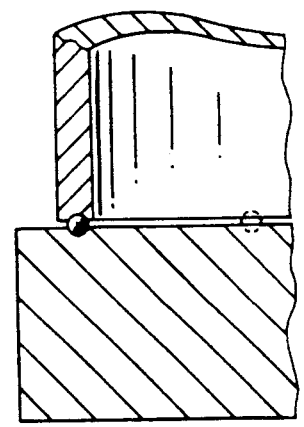

Each end of shell 12 is constrained by end caps 14a and 14b. End caps 14a and 14b are more massive and rigid than shell 12, and therefore are inertial masses that constrain the motion of the shell 12 at its ends. FIGS. 2A-2C depict various means for constraining the ends of shell 12 with end caps 14a and 14b. FIG. 2A shows the ends rigidly fixed. FIGS. 2B and 2C show the ends pinned. Which of these three methods is used may depend on whether shell 12 is pre-stressed by any of the various means discussed below. If shell 12 is pre-stressed in compression, any of the constraining means shown in FIGS. 2A, 2B, and 2C may be used. However, if shell 12 is pre-stressed in tension, the fixed end means of FIG. 2A is used. The embodiments described herein use the fixed end method of FIG. 2A, although, except for the pre-stressed in tension embodiments, the other methods could be used.

Figure 3:
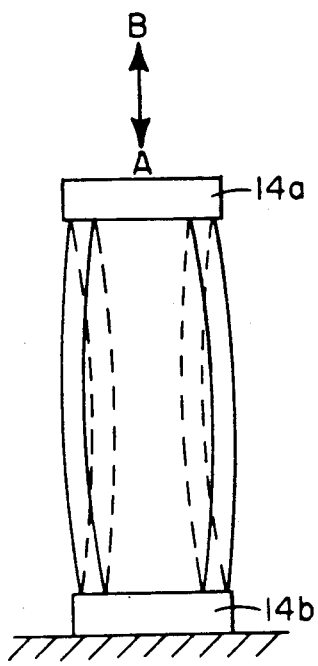
FIG. 3 illustrates axi-symmetrical motion of the transducer of FIG. 1.

FIG. 3 is a cross sectional view of shell 12 and end caps 14a and 14b, showing that the structure of transducer 10 is axi-symmetrical. Although in FIG. 3 the thickness of the cylindrical wall of shell 12 is of uniform thickness, this is not a necessary requirement and, as discussed below, the motion of transducer 10 may be preferentially controlled if the thickness is varied at the midsection of shell 12.

FIG. 3 also shows the motion of transducer 10 when the actuating means, which is described below in connection with FIGS. 11-15, is energized. The forces resulting from the actuating means are indicated by the force arrows, A and B. As discussed below, different embodiments of the transducer use different actuating devices, but in all embodiments, the force resulting from the actuating means is axial, as indicated by force arrows A and B. Furthermore, although force arrows A and B are shown as acting at only one end of the transducer, the actuating means may also provide the same forces as both ends.

For all embodiments of the monopole transducer 10, the motion of shell 12 is axisymmetrical. Thus, if a compressing axial force A is applied to transducer 10 with its base fixed, shell 12 will bulge or expand in outward axi-symmetrical flexure at its midsection with its ends remaining fixed. If the force is reversed, and a tensile axial force B is applied, elongation of transducer 10 will be accompanied by an inward flexing of shell 12, again with the ends remaining fixed. If the axial force A and B are oscillatory, the flexural deflections of shell 12 will also be oscillatory.

FIGS. 4-10 show several means for varying the motion of transducer 10 from the motion shown in FIG. 3. These means include: pre-forming shell 12 by changing its curvature as in FIG. 4, pre-stressing shell 12 as in FIG. 4, or thinning the walls of shell 12 as in FIGS. 7 and 8. As explained below, these modifications affect the manner in which the applied axial force will cause the cylinder walls of shell 12 to move. Furthermore, pre-forming, pre-stressing, and thinning the shell walls are not exclusive of each other; more than one of these modifications can be used on a single transducer to result in a desired motion.

Figure 4:
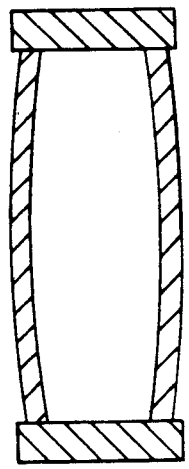
FIG. 4 is a cross sectional view of the transducer of FIG. 1, not including actuating means, wherein the cylinder walls have been pre-formed to bend outwardly.

In FIG. 4, shell 12 has been fabricated to have an outward curvature, which causes a preference for outward motion. It is also possible to shape shell 12 so that it has an inward curvature, which would cause a preference for inward motion.

Figure 5:
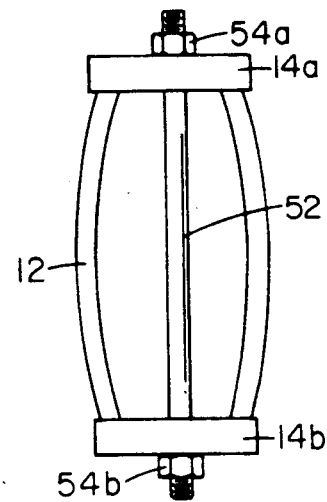
FIG. 5 is a cross sectional view of the transducer of FIG. 1, not including actuating means, showing a stress rod used to pre-stress the walls of the transducer.

In FIG. 5, shell 12 has been pre-stressed to have an outward curvature. This pre-stress may be the result of a static compressional force that causes a static outward deflection of shell 12. One method of introducing this pre-stress is to include a stress rod 52 inside shell 12, along the axis of shell 12, and a means for tensioning stress rod 52. The ends of stress rod 52 are attached to a rigid body that is sufficient in size and shape to provide a bearing surface at each end of shell 12. As shown in FIG. 5, this attachment may be to end caps 14a and 14b. The means for tensioning stress rod 52 may be as simple as a tightening nut at each end of stress rod 52. Thus each end cap 14a and 14b has a hole in its center, through which stress rod 52 extends. Stress rod 52 is threaded at each end, and the ends of stress rod 52 are sufficiently long to extend from both end caps 14a and 14b. Tightening nuts 44a and 44b are threaded onto each end of stress rod 42 and may be turned to apply tensile force to stress rod 52. This translates to a static compressional force on shell 12, which causes shell 12 to be outwardly deflecting.

Figure 6:
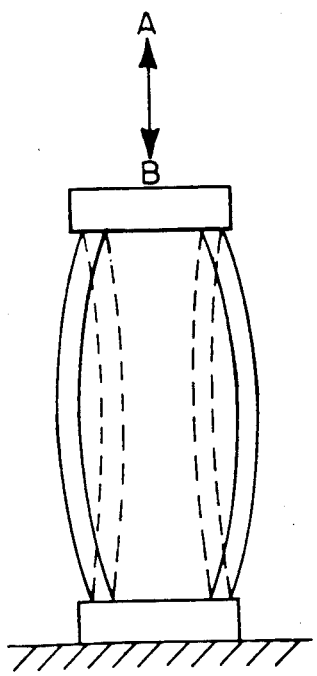
FIG. 6 illustrates the motion of the transducer of FIG. 1 when the cylinder walls are preformed or pre-stressed outwardly.

FIG. 6 illustrates the motion of transducer 10 when shell 12 is preformed or pre-stressed outwardly. When transducer 10 is operated, it deflects outward and inward, but tends to exhibit a preference for outward motion.

Figure 7:
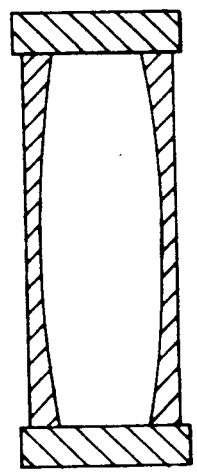
FIG. 7 is a cross sectional view of the transducer, not including actuating means, wherein the cylinder walls have been thinned to create a preference for outward bending.
Figure 8:
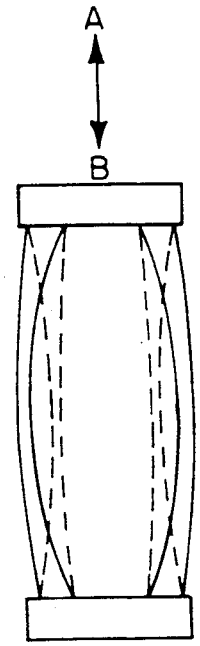
FIG. 8 illustrates the motion of a transducer whose cylinder walls have been thinned as in FIG. 7.
Figure 16:
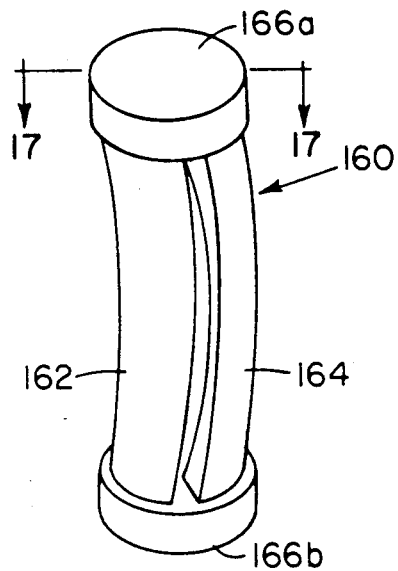
FIG. 16 is a perspective view of an alternative embodiment of the invention, with no actuating means in view, used to approximate a dipole acoustic radiator.

FIGS. 7 and 9 show another means for varying the deflection of transducer 10 from the motion shown in FIG. 3. As shown in FIGS. 7 and 9, the wall thickness of shell 12 has been made thinner at the midsection than at the ends. In FIG. 7, the wall thickness has been made thinner at the midsection by increasing the inside diameter of shell 12. This modification allows the midsection of shell 12 to deflect outward farther under an applied axial compressional force than in the case of a uniform cylinder wall, as shown in FIG. 8. In FIG. 9, the wall thickness has been made thinner at the midsection by decreasing the outside diameter of shell 12. This modification creates a bending moment between the midsection of shell 12 and its ends, and thereby allows the midsection of shell 12 to deflect inward under an applied axial compression, as shown in FIG. 10.

FIGS. 11-15 show various actuating means for the flexing motion of transducer 10. Each of these methods provides a compressional or tensile force, which is axial to shell 12, and acts on the walls of shell 12 at one or both ends of shell 12. In the preferred embodiment, the axial force is uniform around the circumference of shell 12. This may be accomplished by applying the force against end caps 14a and 14b, although any other structure that bears upon the shell walls in a similar manner may be used.

The axial forces on the walls of shell 12 cause the cylinder walls of shell 12 to flex outward or inward as discussed above. Generally, the actuating means are either piezoelectric or magnetostrictive devices. The piezoelectric devices are able to tolerate high temperatures in boreholes and have high electromechanical transduction efficiency. The magnetostrictive devices have the same desirable operating characteristics in even higher tolerance of extreme borehole temperature conditions.

The actuating device shown in FIG. 11 comprises a piezoelectric stack 112. The piezoelectric material of the preferred embodiment is ceramic, which is operates well under high temperature conditions. Stack 112 is mounted inside shell 12 along the axis of shell 12. Stack 20 is comprised of a number of piezoelectric disks 114a-114n, one atop the other. Disks 114a-114b are polarized so that their thickness varies when electrically excited. Stack 112 is pre-stressed in compression inside shell 12, and is thus always in firm contact with end caps 14a and 14b, regardless of whether stack 112 is energized to contract or expand. Thus, a static tensile force exists within shell 12 on end caps 14a and 14b, together with a static compressional force on stack 112.

When electrically excited to expand, stack 112 causes an outward force on end caps 14a and 14b, which causes shell 12 to deflect inward. Contraction of stack 112 causes the tensile force in shell 12 to decrease, which causes shell 12 to deflect outward. Electrical excitement of stack 20 can cause it to expand and contract sequentially, thereby imparting an oscillatory driving force to produce deflections of transducer 10.

FIG. 12 illustrates the manner in which disks 114a-114n are assembled in mechanical series and connected in electrical parallel. This permits large axial piezoelectric response of stack 112 to be produced with relatively low excitation voltages.

FIGS. 13 and 14 show two alternative means for applying axial force to shell 12. Although both of these alternatives make use of at least one piezoelectric stack, shown as 132 in FIG. 13 and 142a and 142b in FIG. 14. A significant feature is that shell 12 and the stack 132 or stacks 142a and 142b are pre-stressed in static compression by means of a tensile stress rod 52. The purpose of this pre-stress is to maintain contact between piezoelectric stack 132a or stacks 142a and 142b and at least one end of shell 12. As explained above in connection with FIG. 5, stress rod 52 is placed along the axis of shell 12, and the tension imparted by stress rod 52 results from the tightening of end nuts 54a and 54b.

The disks from which the piezoelectric stacks 132, 142a, and 142b are made are annular in shape to accommodate stress rod 52. The disks are configured to expand or contract in thickness when electrically energized, which causes the stack to lengthen or shorten. This in turn, causes an axial force on the walls of shell 12 at that end of shell 12. In FIG. 13, piezoelectric stack 132 is adjacent to one end of shell 12, thus force is applied at one end of shell 12. In FIG. 14, piezoelectric stacks 142a and 142b are at both ends of shell 12, thus force is applied at both ends of shell 12. The disks of stacks 44, 46a, and 46b may be electrically connected in a manner similar to that shown in FIG. 12.

Figure 15:
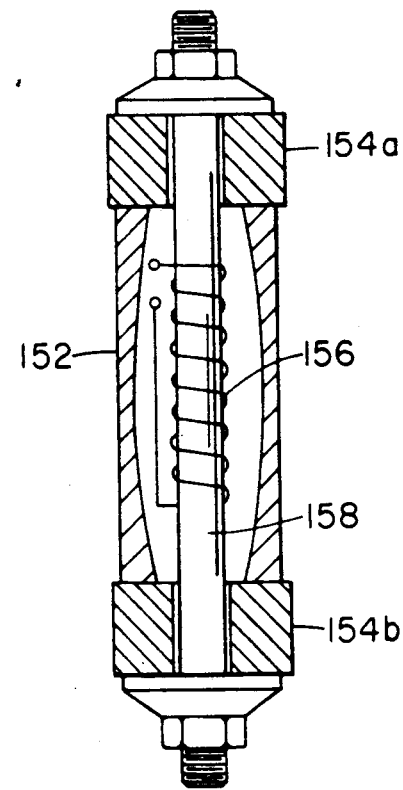
FIG. 15 is a cross sectional view of the transducer of FIG. 1, including an actuating means comprising a magnetostrictive driver.

If the walls of shell 12 are uniform in thickness or are thinned by increasing the inside diameter of shell 12, the compressional pre-stressing resulting from stress rod 42 causes a preference for outward deflection. Alternatively, the walls of shell 12 may be thinned by decreasing the outer diameter of shell 12, thereby permitting inward deflection. FIG. 15 shows another type of actuating device that is magnetostrictive rather than piezoelectric. The magnetostrictive elements are shell 152, permanent magnets 154a and 154b, and coil 156. Like the piezoelectric embodiments of FIGS. 13 and 14, a tension rod 158 along the axis of the transducer imparts a compressional pre-stress on shell 152. Magnets 154a and 154b bias the circuit and provide a static flux density, whereas coil 156 is used to induce a magnetic flux.

Magnet 154a is fixed at one end of shell 152 and magnet 154b is fixed at the other end. Preferably, magnets 154a and 154b are annular disks, to permit tension rod 152 to pass through them. For proper biasing, magnets 154a and 154b are each radially magnetized, with the magnetization of magnet 154a being opposite to that of magnet 154b. For example, if magnet 154a is polarized with its outer diameter as N and its inner diameter as S, magnet 154b should be oppositely polarized.

Shell 152 and tension rod 158 are concentrically arranged, with shell 152 being made of a permeable metal. More specifically, shell 152 is made of a magnetostrictive material having a positive magnetostrictive coefficient, such as the alloy Alfer, which is 13% aluminum and 87% iron. Tension rod 158 is made from a magnetostrictive material having a negative magnetostrictive coefficient, such as nickel. Alternatively, the material for shell 152 and tension rod 158 can be negative for shell 152 and positive for tension rod 158. To avoid eddy current losses and optimize operating efficiency, tension rod 158 should be constructed using length oriented laminations.

Coil 156 is electrically conductive and is wrapped around a portion of the outer diameter of tension rod 158. By introducing an electrical current in coil 156, a magnetic flux is induced in the magnetic circuit and shell 152 is made to deflect.

In FIG. 15, the transducer is outward deflecting as a result of the thinner wall thickness and the increased inner diameter of shell 152. Alternatively, the transducer could be made inward deflecting if the outer diameter of shell 152 were decreased as in FIG. 9.

B. DIPOLE TRANSDUCER

FIGS. 16-19 show an embodiment of the invention that approximates a sonic dipole source. This embodiment, shown as transducer 160, combines the features of the outward and inward deflecting embodiments of FIGS. 7 and 9. An important feature of the dipole transducer is the generation of asymmetrical motion. In geophysical applications, when the dipole transducer is placed in a borehole and energized, it generates horizontally polarized shear waves in the surrounding rock formations. The measurements from these waves can be used to determine the shear wave velocity and other parameters of the geological formation being tested.

The dipole transducer replaces the cylindrical shell of the monopole embodiments with two cylindrical sections 162 and 164, which are each less than a half cylinder and are preferably slightly less than a half cylinder. The ends of cylindrical sections 162 and 164 are constrained by end caps 166a and 166b, in a manner similar to that discussed above in connection with FIGS. 2A-2C. Cylindrical sections 162 and 164 are arranged in a fixed position so that their combined shape approximates a cylinder.

Figure 17:
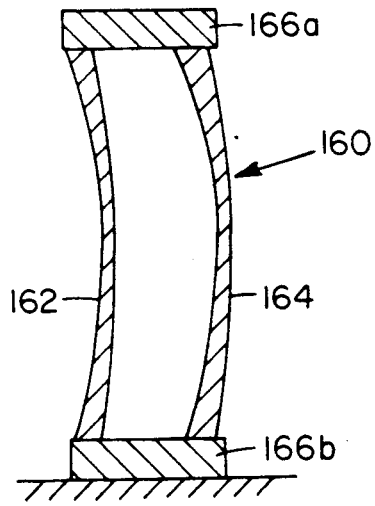
FIG. 17 is a cross sectional view, not including an actuating means, of the transducer of FIG. 16 along section lines 17—17.

As shown in FIG. 17, flexing members 162 and 164 are constructed so that they are oppositely deflecting. This is accomplished in a manner similar to the construction of the embodiments shown in FIGS. 7 and 9, but using half cylindrical sections rather than cylinders. Thus, the inner diameter of one cylindrical section 162 or 164 is increased, and the other diameter of the other cylindrical section 162 or 164 is decreased.

Figure 18:
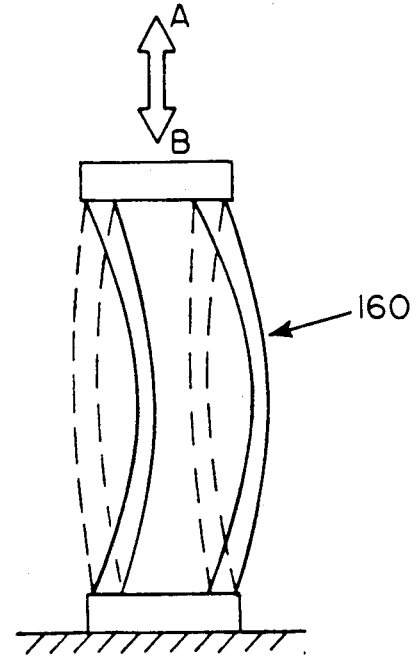
FIG. 18 illustrates the motion of the transducer of FIG. 17.

FIG. 18 is a cross sectional view of the dipole transducer in motion, when energized by an actuating means (not shown). The actuating means may be any of the actuating means discussed above in connection with FIGS. 8-15. An oscillating force resulting from the actuating means, such as indicated by force arrows A and B, will result in diametrically opposing asymmetrical deflections of the dipole transducer. These deflections are asymmetrical with respect to the axis of transducer 160, and permits transducer 160 to approximate the operation of an acoustic dipole source. For example, dipole transducer 160 may include the actuating and compressional pre-stressing means of FIG. 13. In this configuration, the axial expansion of piezoelectric stack 44 will impose an additional compressional stress on the two flexing members 162 and 164 causing them to be further deflected outwardly and inwardly as shown in FIG. 18.

C. QUADRUPOLE TRANSDUCERS

Figure 19:
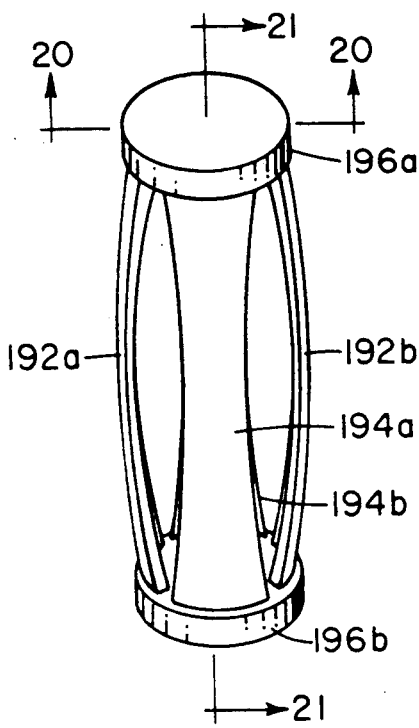
FIG. 19 is a perspective view of an alternative embodiment of the invention, with no actuating means in view, used to approximate a quadrupole acoustic radiator.
Figure 20:
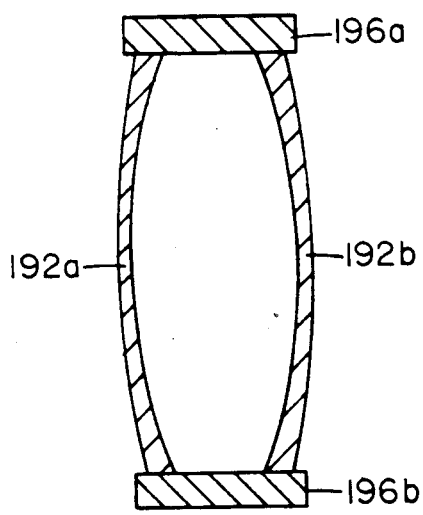
FIG. 20 is a cross sectional view at section 20—20, not including an actuating means, of the transducer of FIG. 19.
Figure 21:
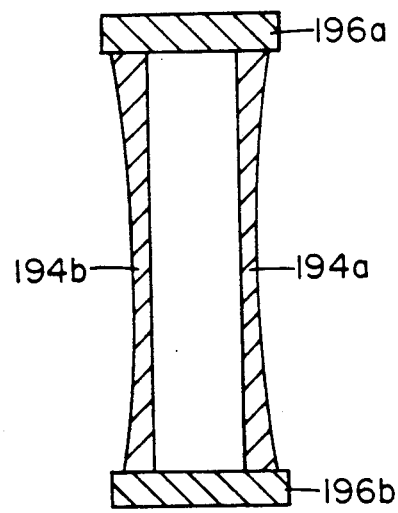
FIG. 21 illustrates a cross-sectional view at Section 21—21, not including an actuating means, transducer of FIG. 19.

FIGS. 19-21 show an embodiment of the invention that approximates a sonic quadrupole transducer. This embodiment, shown as transducer 190, combines the features of the outward and inward deflecting embodiments of FIGS. 7 and 9 and the features of the dipole transducer 160. A feature of the quadrupole transducer is the generation of a combination of compressional waves and shear waves in surrounding rock formations when the transducer is placed in a borehole. A particular mode of elastic wave propagation in the drilled rock formation, as excited by a quadrupole source transducer, is known as the "screw" or "helical" mode, which is especially useful in determining the presence of fractures and anisotropic geological conditions surrounding the borehole.

In the quadrupole transducer embodiment 190, the cylindrical shell of the monopole embodiments is replaced with two pairs of cylindrical sections 192a and 192b and 194a and 194b, which are each less than a quarter cylinder and are preferably slightly less than a quarter cylinder. Cylindrical sections 192a, 192b, 194a and 194b are arranged in fixed positions so that their combined shape approximates a cylinder. Cylindrical section 192a is diametrically opposed to the other member of its pair, cylindrical section 192b. Similarly, cylindrical section 194a is diametrically opposed to the other member of its pair, cylindrical section 194b.

Flexing members 192a, 192b, 194a, and 194b are shaped or pre-stressed or both to be oppositely deflecting in two orthogonal planes, C and D. FIGS. 20 and 21 are cross-sectional views of the quadrupole transducer in these two planes. This construction is similar to the construction of the embodiments shown in FIGS. 7 and 9, but using half cylindrical sections rather than cylinders. Thus, the inner diameter of one pair of cylindrical sections 192a and 192b is increased, and the outer diameter of the other pair of cylindrical sections 194a and 194b is decreased.

The ends of each flexing member 192a, 192b, 194a, and 194b are attached to end caps 196a and 196b, in a manner similar to that discussed above in connection with FIGS. 2A-2C.

The actuating means of the quadrupole transducer is now shown in FIGS. 19-21, but may be any of the actuating means discussed above in connection with FIGS. 8-15. An axially oriented oscillating force resulting from the actuating means applied to the transducer 190 will cause outward deflections in one plane and inward deflections in a second plane oriented at 90 degrees with respect to the first plane. For example, if the transducer of FIGS. 14-16 includes the actuating and compressional pre-stressing means of FIG. 13, the axial expansion of piezoelectric stack 45 will impose an additional compressional stress on the four flexing members 192a, 192b, 194a, and 194b, causing them to be further deflected outwardly and inwardly.

D. RECEIVER TRANSDUCERS

The descriptions above are directed toward the use of the invention as a source transducer, which is actuated to produce bending of the cylinder walls. A feature of the invention, however, is that each of the transducers operate reciprocally. In other words, pressure waves against the cylinder walls cause them to bend, which causes a voltage to be generated, by the reciprocal action of the piezoelectric or magnetostrictive transducer mechanisms. When used as receiving transducers, they can be configured and oriented so that they are sensitive to a desired type of wave, such as compressional or shear or other wave type.

Although the invention has been described with reference to specific embodiments, this description is not meant to be construed in a limiting sense. Various modifications of the disclosed embodiment, as well as alternative embodiments of the invention, will become apparent to persons skilled in the art upon reference to the description of the invention. It is therefore contemplated that the appended claims will cover such modifications that fall within the true scope of the invention.

I claim:

1. A cylindrical transducer for approximating a dipole acoustic radiator, comprising:

a first cylindrical section, having a wall that is relatively thin compared to its radius, said wall being thinned at the midsection by decreasing the outer diameter of said cylindrical section, said thinned wall imparting a preference of said first cylindrical section to flex inwardly when longitudinally compressed, said cylindrical section having a top and a bottom end, a second cylindrical section, having a wall that is relatively thin compared to its radius, said wall being thinned at the midsection by increasing the inner diameter of said cylindrical section, said thinned wall imparting a preference of said second cylindrical section to flex outwardly when longitudinally compressed, said cylindrical section having a top and a bottom end, means for attaching said first and second cylindrical sections in a fixed position such that together their shape approximates a cylindrical shell, an actuating means for providing an axial force at least one of said ends of said cylindrical sections, inertial masses at each of said ends of said cylindrical sections for constraining the movement of said shell at said ends, and means for connecting said actuating means to said cylindrical sections so that energization of said actuating means causes said cylindrical section walls to bend asymmetrically relative to the axis of said cylindrical shell.

2. The transducer of claim 1 wherein said cylindrical section walls are preformed to curve inwardly or outwardly, thereby imparting a preference of said walls to flex inwardly or outwardly.

3. The transducer of claim 1 further comprising means for pre-stressing said cylinder walls in compression.

4. The transducer of claim 3 wherein said pre-stressing means comprises a tension rod along the axis of said cylindrical shell.

5. The transducer of claim 1 wherein said actuating means comprises a stack of piezoelectric disks axially oriented inside said cylindrical shell, configured such that said stack expands or contracts longitudinally when electrically energized.

6. The transducer of claim 1 wherein said actuating means comprises a stack of piezoelectric disks axially oriented outside said cylindrical shell, adjacent to one of said ends of said cylindrical shell, configured such that said stack expands or contracts longitudinally when electrically energized, and a means for pre-stressing said actuating means against said cylindrical shell in compression, such that contact between said shell and said actuating means is maintained during said expansion and contraction.

7. The transducer of claim 1 wherein said actuating means comprises a magnetostrictive circuit.

8. The transducer of claim 7 wherein said magnetostrictive circuit comprises a permanent magnet at each end of said cylindrical shell and a magnetic flux providing coil.

9. The transducer of claim 1 wherein said inertial masses, said attaching means, and said connecting means are end caps at the ends of said cylindrical shell.

10. The transducer of claim 1 wherein said transducer receives rather than generates acoustic waves, and thus said actuating means responds to, rather than creates, bending motion of said cylinder walls and said means for connecting said actuating means to said cylindrical shell permits said actuating means to respond to said bending.

11. A cylindrical transducer for approximating a quadrupole acoustic wave source, comprising:

a first and a second cylindrical section, each having a wall that is relatively thin compared to its radius, said walls being thinned at the midsection by decreasing the outer diameter of said section, said cylindrical sections having a top and a bottom end, a third and a fourth cylindrical section, each having a wall that is relatively thin compared to its radius, said walls being thinned at the midsection by increasing the inner diameter of said cylindrical section, said cylindrical sections having a top and a bottom end, means for attaching said first and third and said second and fourth cylindrical sections diametrically opposed to each other, in a fixed position, such that together said cylindrical sections approximate a cylindrical shell, an actuating means for providing an axial force at one of said ends of said cylindrical sections, inertial masses at each of said ends of said cylindrical sections for constraining the movement of said shell at said ends, and means for connecting said actuating means to said cylindrical sections so that energization of said actuating means causes said cylindrical section walls to bend asymmetrically with respect to the axis of said cylindrical shell.

12. The transducer of claim 11 wherein said cylindrical section walls are pre-formed to curve inwardly or outwardly, thereby imparting a preference of said walls to flex inwardly or outwardly.

13. The transducer of claim 11 further comprising means for pre-stressing said cylinder walls in compression.

14. The transducer of claim 11 wherein said pre-stressing means comprises a tension rod along the axis of said cylindrical shell.

15. The transducer of claim 14 wherein said pre-stressing means comprises a tension rod along the axis of said cylindrical shell.

16. The transducer of claim 12 wherein said actuating means comprises a stack of piezoelectric disks axially oriented inside said cylindrical shell, configured such that said stack expands or contracts longitudinally when electrically energized.

17. The transducer of claim 12 wherein said actuating means comprises a stack of piezoelectric disks axially oriented outside said cylindrical shell, adjacent to one of said ends of said cylindrical shell, configured such that said stack expands or contracts longitudinally when electrically energized, and a means for pre-stressing said actuating means against said cylindrical shell in compression, such that contact between said shell and said actuating means is maintained during said expansion and contraction.

18. The transducer of claim 11 wherein said actuating means comprises a magnetostrictive circuit.

19. The transducer of claim 18 wherein said magnetostrictive circuit comprises a permanent magnet at each end of said cylindrical shell and a magnetic flux providing coil.

20. The transducer of claim 11 wherein said inertial masses, said connecting means, and said attachment means are end caps on said ends of said cylindrical shell.

* * * * *